United States Patent

Burger et al.

[11] Patent Number: 5,856,877
[45] Date of Patent: Jan. 5, 1999

[54] APPARATUS AND METHOD FOR PROCESSING AND REPRODUCING IMAGE INFORMATION

[75] Inventors: Johan Hendrik Burger, Visé, Belgium; Edwin F. J. Jansen, BW Venlo, Netherlands

[73] Assignee: OCE-Nederland, B.V., MA Venlo, Netherlands

[21] Appl. No.: 999,834

[22] Filed: Jul. 3, 1996

Related U.S. Application Data

[63] Continuation of Ser. No. 257,921, Jun. 10, 1994, abandoned.

[30] Foreign Application Priority Data

Jun. 11, 1993 [NL] Netherlands ............................ 9301004

[51] Int. Cl.$^6$ ............................ H04N 1/40; H04N 1/387; G06K 9/34
[52] U.S. Cl. ............................ 358/452; 358/448; 382/173
[58] Field of Search ............................ 358/448, 452, 358/451, 453, 455, 456, 527, 537, 538; 382/254, 173

[56] References Cited

U.S. PATENT DOCUMENTS

| | | | |
|---|---|---|---|
| 3,848,856 | 11/1974 | Reeber | 358/527 |
| 4,829,586 | 5/1989 | Motegi | 382/297 |
| 4,985,930 | 1/1991 | Takeda | 358/452 |
| 5,079,625 | 1/1992 | Kitamura | 358/537 |

FOREIGN PATENT DOCUMENTS

| | | |
|---|---|---|
| 0415373 | 3/1991 | European Pat. Off. . |
| 0496531 | 7/1992 | European Pat. Off. ......... G06K 9/32 |
| 1522514 | 8/1978 | United Kingdom . |
| 2151106 | 7/1985 | United Kingdom . |

OTHER PUBLICATIONS

"Block Segmentation of Document Images Using the X–Y Tree Approach", W. Lam et al., Tech. Rep., U. at Buffalo, Jun. 1988, pp. 1–23.

"Reading Newspaper Text", S. Lam et al., U. at Buffalo, 1990, pp. 703–705.

"Document Image Understanding", Surgur N. Srihari, University of New York at Buffalo, 1986, pp. 87–96.

Image Transformation Encoding for Interactive Document Formatting IBM Tech. Discl. Bull., vol. 29 #8, Jan. 1987.

A Segmentation Method Based on Office Document Hierarchical Structure, Iwaki et al., NTT Elect. Commun. Labs, 1987, pp. 759–763.

*Primary Examiner*—Kim Yen Vu
*Assistant Examiner*—Kimberly A. Williams

[57] ABSTRACT

Layout analysis is used in operating a digital reproduction apparatus. The device automatically segments the digital image dot data corresponding to a document image to be reproduced, to determine layout elements of the document. This is shown on a display. An operator can now select a specific layout element, such as a text column, by indicating it, and instruct the image processing unit of the apparatus to process only that element. The processing operations include color printing, gradation changing, moving and enlargement/reduction.

40 Claims, 6 Drawing Sheets

| SELECTION LEVEL | INCLUDE | OPERATION |
|---|---|---|
| ○ OBJECT | ○ LOAD | ○ SET COLOR |
| ○ BLOCK | ○ CREATE PAGE | ○ SET CONTRAST |
| ○ LINE | CUT & PASTE | ○ RESIZE |
| ○ WORD | ○ DUPLICATE | ○ INVERT |
| ○ AREA | ○ MOVE | ○ ROTATE |
| ○ PAGE | ○ REMOVE | UP ○  ○ DOWN |

# APPARATUS AND METHOD FOR PROCESSING AND REPRODUCING IMAGE INFORMATION

This application is a continuation of application Ser. No. 08/257,921 filed on Jun. 10, 1994, now abandoned.

BACKGROUND OF THE INVENTION

1. Field of the Invention

The invention relates to an apparatus and method for processing and reproducing image information, and more specifically, to reproducing an image from digital image dot information.

2. Discussion of Related Art

Apparatus of this kind are generally known. In these known apparatus, a document is scanned by means of an optoelectrical scanner and digital image dot data is generated which corresponds to the document image. The image dot data is stored in a memory, processed and printed. Digital image dot data can also be supplied from another device, stored in the memory, and be printed after processing. The processing is generally aimed at adapting the image data so that a good print is obtained, e.g. converting grey value data into halftone data, i.e. image data which can only have the value black or white for each image dot.

In addition, processing may be aimed at changing the appearance of the printed image of the document according to an operator's choice. This is usually referred to as editing. In that case, selection means, such as a digitizing panel and an indicator pen, can be used to indicate an area of the document, whereafter a processing function instruction can be given to change the appearance of the indicated area. A disadvantage of the conventional devices is that the areas to be processed must be indicated very accurately. If an area to be processed is indicated carelessly, a part which should really also have been processed may easily be omitted.

SUMMARY OF THE INVENTION

Therefore, it is an object of the present invention to provide an apparatus and method for reproducing images from digital image dot information which will overcome the prior art disadvantages.

A further object of the invention is to provide a copying or printing apparatus suitable for simple and rapid processing of a document image, the result being a print with an appropriately adapted appearance.

The foregoing objects and others are accomplished in accordance with the present invention, generally speaking, by providing an apparatus for reproducing an image from digital image dot information, comprising an operating means, means for supplying digital image dot information representing the image, a memory for storing image dot information, means for processing the supplied image dot information and means for printing the processed image dot information on an image support. The term "image dot information" in this context denotes the density values of pixels (image dots) disposed in an orthogonal raster and together corresponding to the image.

The apparatus is characterized by a segmentation means connected to the memory, for automatically segmenting the digital image dot information into layout elements, the operating means being connected to the segmentation means in order to receive therefrom results of the segmentation and being provided with a means for displaying the results to an operator, first selection means for selecting one or more layout elements found during the segmentation, and second selection means for selecting a processing operation while also being connected to the processing means for controlling the same in order to process a selected layout element in accordance with a selected processing operation. The segmentation means automatically analyze the layout of the document, i.e., they search in the document for the separate characters, words, lines, text blocks, and also photographs, graphics, etc., and determine the mutual topographic relationship between them. It is not necessary for the segmentation means also to determine the content of the text elements and the mutual logical relationship between the layout elements.

The determined layout of the document is shown to the operator, e.g. on a display, whereupon he can select layout elements just as is done on the display of a word processor station. Under these conditions the knowledge acquired of the layout helps for the selection to proceed properly. For example, if the operator indicates a word, the first selection means will also select precisely that word. The operator can then specify a given processing operation which will then be carried out on the selected layout element by the processing means. Such processing operations are, for example, adaptation of the grey value scale or the color with which the selected layout element is reproduced on the print. Especially for scanned photographs, the introduction of a raster is desirable for a high-quality reproduction. When this operation is selected for a photo area, the original gray level image is converted into a dot image (as in newspaper photographs) for that area.

Other processing operations come more under the heading of word processing, such as changing the orientation (rotation) and even moving a layout element. In this way the utility of the editing function is greatly increased.

Layout analysis is well known in the art, as will be discussed hereinafter. It is used in combination with optical character recognition (OCR) in systems for automatic text analysis. Such systems first segment a document into blocks of text, such as columns. Within such blocks, lines and separate words are then identified, followed by an OCR algorithm recognizing the characters. When several text blocks appear on a page, the logical order of the blocks, i.e., the order in which the blocks have to be read, must be determined in advance. In complex text documents, such as newspaper pages, the text blocks of one article often do not have a simple, position-related order, and it may be impossible for the automatic layout analysis to find the reading order by itself. In a system, disclosed in EP 0415373A, an automatically determined reading order is indicated in a displayed image of text blocks recognized by a layout analysis section. An operator may then select one or more blocks with a cursor and change the predetermined reading order. This selection is different from the selection procedure of the present invention in that it is aimed at identifying text blocks as entities in the logical structure of a text document, and is not related to the actual area or perimeter of a specific layout element.

Layout analysis of the kind taking place in the segmentation means can be performed in various ways. Two methods are described in William Lam et al: "Block Segmentation of Document Images Using the X-Y Tree Approach", TR 88-14, Dept of Computer Science, SUNY Buffalo, N.Y., June 1988 and in Stephen W. Lam: "Reading Newspaper Text", Proc. of 10th International Conference on Pattern Recognition, New Jersey, USA, Jun. 16–21, 1990, pp. 703–705. In addition, the inventors of the apparatus, according to the present invention have developed a third different method, which is described below.

In the document by William Lam et al., layout analysis of a document page is discussed by reference to two segmentation algorithms: the top-down algorithm and the bottom-up algorithm. In the top-down algorithm, vertical and horizontal projection profiles are made by projecting all the image dots on to the x-axis or y-axis respectively and counting their numbers as a function of the location on the associated axis. These profiles are used to check whether a document page can be divided into a set of layout structure elements by plane cuts. Plane cuts are permissible only if no or substantially no image dots are situated on a cutting line or band. If each subblock of the document page formed by the cuts in one direction is again cut in the other direction in the next operation, increasingly smaller subblocks are formed until no more cuts are possible. In the case of a text page this means that the level of the individual characters has been reached. The disadvantage of this algorithm is that for each new cut required all the image dots must be processed to determine a new projection profile, and this requires considerable computing time.

On the other hand, in the case of the bottom-up algorithm, described in the publication by Stephen W. Lam, adjoining image dots are first grouped whereupon the group structures thus formed are in turn combined to form larger structures when they are closer together than a predetermined distance. This usually only takes place on the condition that the structures involved are of the same characteristic type of information, e.g. text information. A disadvantage of the bottom-up algorithm is that it can recognize the large structures only with difficulty because of its detail approach. For example, narrow boundaries which always recur at the same place in consecutive lines, are easy to recognize viewed as a whole but may be completely overlooked from the detail perspective. Another disadvantage of such an algorithm is that a label once assigned to a group structure with respect to the characteristic type of information can no longer be changed during the segmentation process. For example, an advertising text in a photograph will be permanently regarded as text although practice shows that it is better to treat such a text as part of a photograph. Image processing operations such as enlargement or reduction, grey value adjustment, compression, etc., should of course be carried out for the entire photograph, including the text part thereof.

In the segmentation method used in the instant invention, however, the digital image dot information is first searched for objects formed by clusters of adjoining information-bearing image dots, and then further operations are carried out on the set of objects in order to divide the page image into blocks. This gives a considerable reduction of the amount of data to be processed, so that the complete segmentation processing of a document page takes place much more rapidly than the methods known from the prior art.

In one embodiment, data relating to location, measurements and type of information (e.g. character, photograph, graphics) is determined for each object. The layout analysis, which is only logical for text areas in a document, can now be automatically restricted thereto by using, for the segmenting operations, only objects which represent a character. On the other hand, some editing operations should preferably be performed on all layout elements of a specific kind. For instance, a rasterizing operation as described before should be applied on all photographs in a scanned original document. For that case, the first selection means can also be used in a generic fashion, that is, in the instance given, all photographs can be selected at once by a suitable generic command. A document which is skew with respect to the directions used in the segmenting operations, i.e., the vertical and horizontal directions, is less satisfactorily segmented because layout elements may overlap one another. It is therefore advisable first to examine the set of objects for skewing, prior to the segmenting operations, and if such skewing is present this should first be eliminated by moving the objects.

BRIEF DESCRIPTION OF THE DRAWINGS

The invention will now be explained with reference to the accompanying drawings wherein.

DETAILED DISCUSSION OF THE INVENTION

Figures 1, 7:
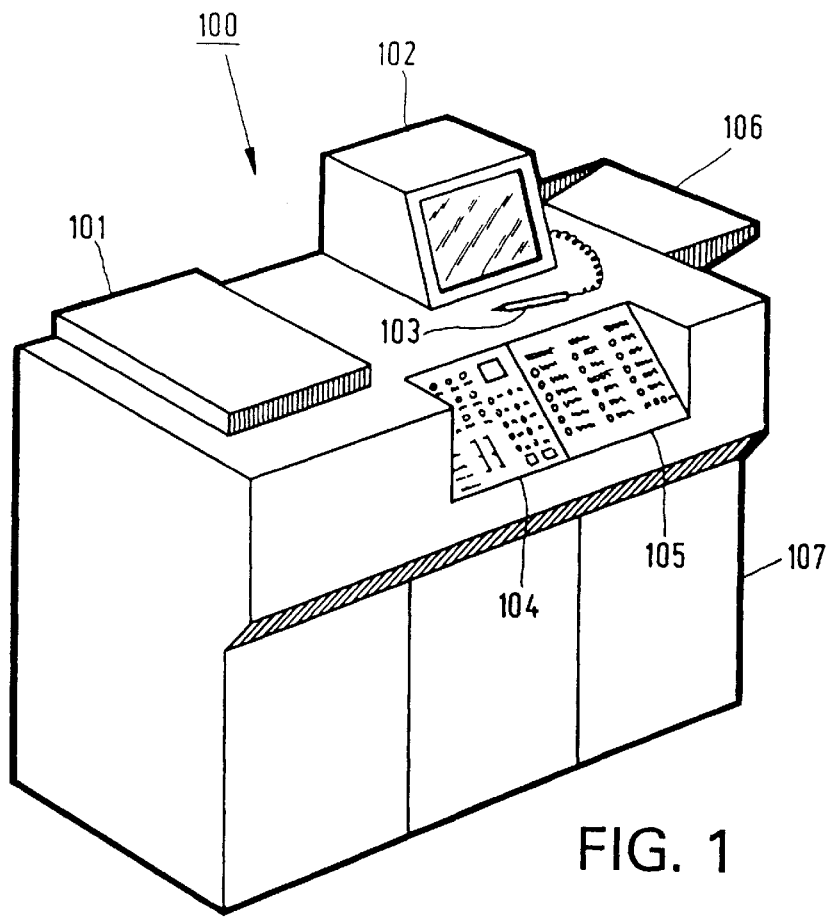
FIG. 1 shows a reproduction apparatus for digital image information according to the invention.
FIG. 7 shows a control panel of the reproduction apparatus shown in FIG. 1.

FIG. 1 shows a digital copying machine/printer 100 provided with a scanner stage 101 for electronically scanning a document, a display unit 102, an indicator element or light pen 103 for indicating locations on the display, a control panel including of two parts 104 and 105, and a tray 106 to receive prints, and finally a processing stage 107. The machine can be connected by a cable (not shown) to one or more external digital image dot information sources. Of course another indicator element, such as a mouse, coupled to a cursor on the display may be used instead of the light pen 103. A touch-sensitive display may also be used so that an operator can indicate the various elements with his finger.

Digital grey value image information is obtained by scanning a document in the scanner stage 101 and is stored in an internal memory. If required, image information can also be received from an external source, e.g. a computer or work station, and stored in the internal memory. The digital image information is subjected to halftoning, so that it is put into the form of a raster pattern of image dots which are white or black, and can then be printed in the processing stage 107 on a sheet of paper which is then deposited in tray 106. The construction and operation of a processing stage of this kind is public knowledge and does not form part of the invention and will not therefore be explained further.

The control panel consists of a part 104 for the normal copying and printing process and a part 105 for operating the layout analysis and image processing coupled thereto. This function will be described in detail with reference to the control means on panel 105 in FIG. 7. The part 105 of the control panel can of course also be in the form of an image made visible on the display, while the functions indicated on the panel can be selected by indicating them with the indicator element.

Figure 2:
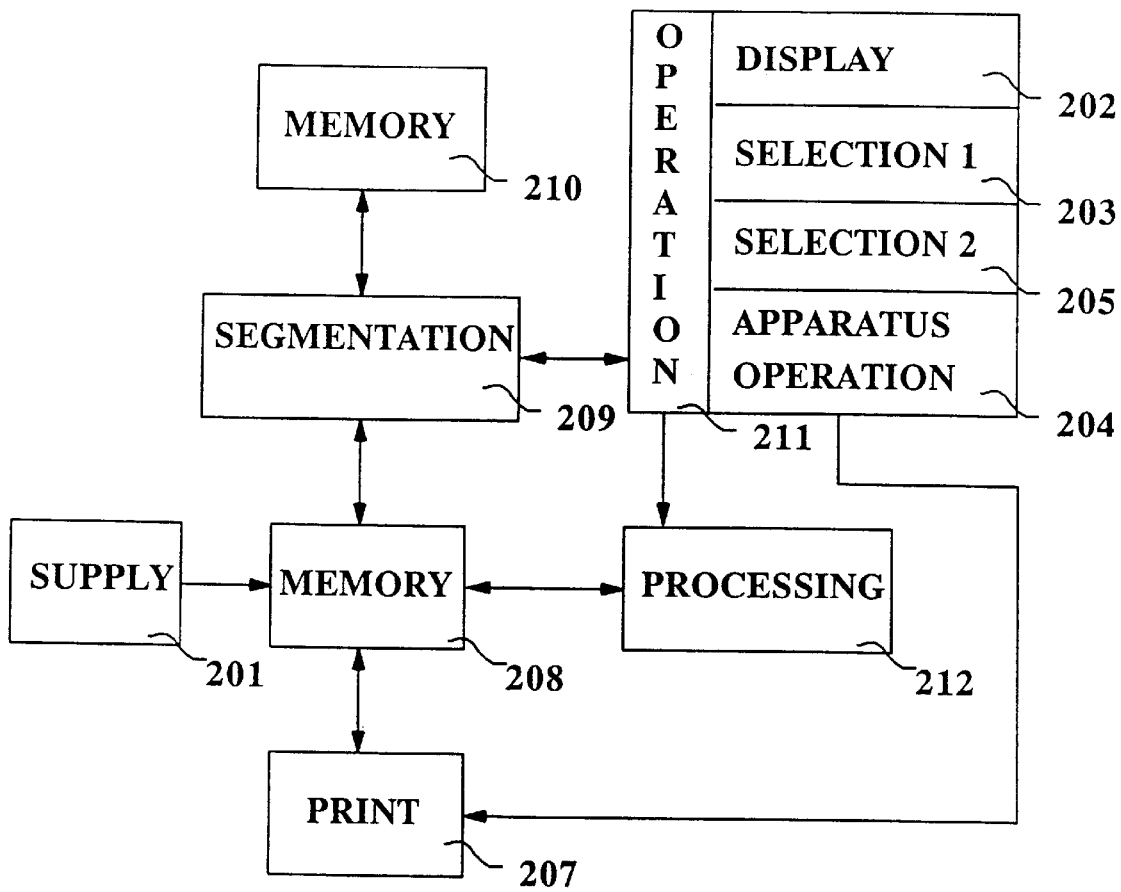
FIG. 2 is a block diagram of the functional construction of the apparatus in FIG. 1.

FIG. 2 illustrates the functional construction of the apparatus 100 in the form of a block diagram. Supply unit 201, e.g. corresponding to scanner 101, is connected to image memory 208. Also connected to memory 208 are the segmentation module 209, processing module 212 and printing unit 207, and these three elements are also connected to operating unit 211. The latter has a display 202 corresponding to display unit 102, a first selection unit 203 corresponding to indicator unit 103, a second selection unit 205 corresponding to control panel 105 and an apparatus operating unit 204 corresponding to control panel 104. Segmentation module 209 is also connected to a memory 210.

Figure 3:
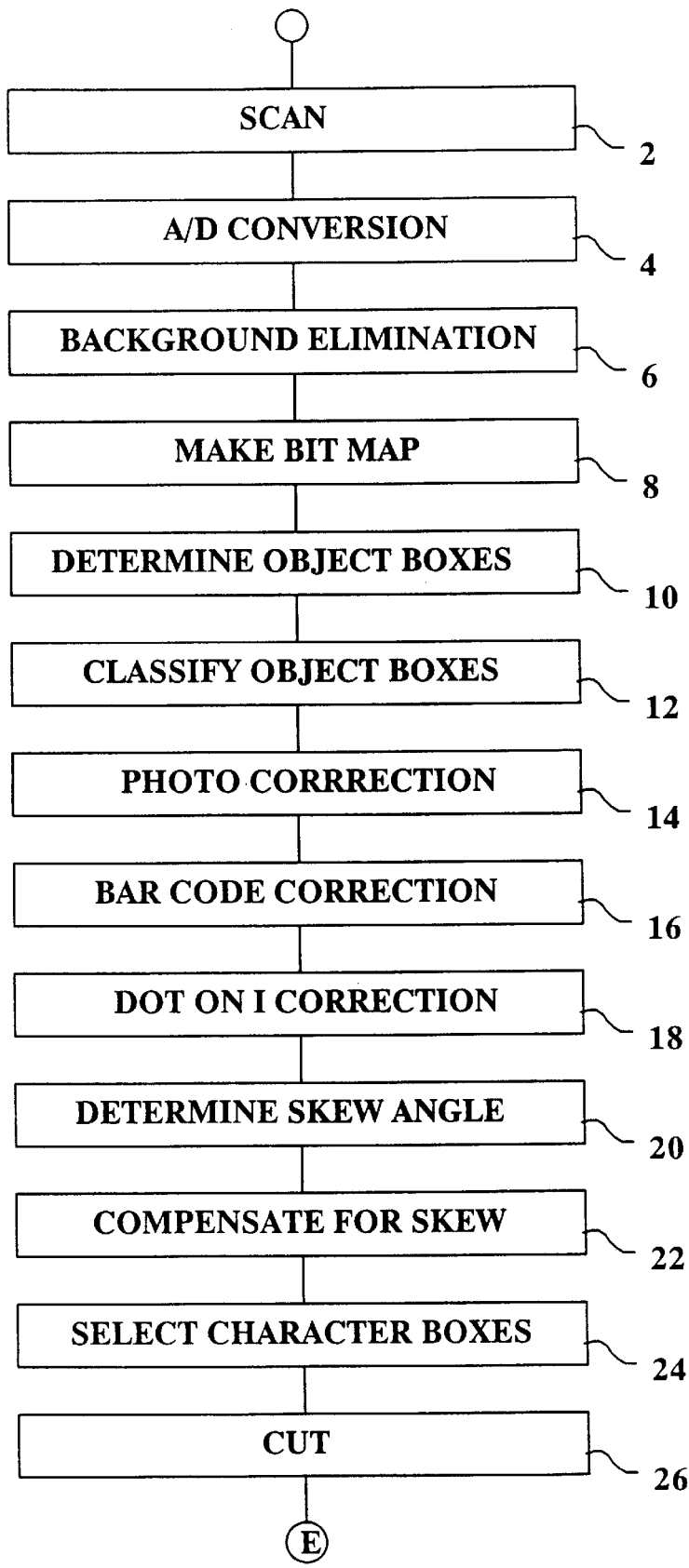
FIG. 3 is a flow diagram of a method of segmenting a document page.

The operation of the segmentation module 209 will first be discussed, followed by the function and operation of the other elements of the apparatus. FIG. 3 is a flow diagram to illustrate a method of segmenting a document page. In this flow diagram, step 2 represents the dotwise scanning of a document page. The information obtained by scanning is digitized in step 4 to a multibit form of representation. Steps 2 and 4 describe the generation of the image data and thus do not form part of the actual segmentation process. They have been added to give a complete picture of the total path covered by the image data through the system. The brightness information concerning the page background is then removed from this image information in step 6, so that only the information-bearing image dots or pixels remain. This can be effected in a number of ways. One possible way is to make a grey value histogram of the information of the entire page (or part thereof). In this histogram, a narrow tall peak situated on the light side of the histogram will represent the brightness of the background and by reference to this a threshold value is determined with which the image information is then compared dotwise. Image dots whose brightness is situated beneath the threshold value are removed, so that the background is eliminated. In step 8 the image information is converted to binary form and stored in a memory file (bit map). This conversion is done by reference to a threshold value, for which the threshold value obtained in step 6 can be used. In that case steps 6 and 8 can be combined.

At this moment the number or amount of data to be processed can be reduced. Many scanners operate with a resolution of about 16 dots per millimeter (400 dpi), but this resolution often appears unnecessary for a correct segmentation. In practice, even a resolution of 2 dots per millimeter appears to give good results often enough. A reduced resolution of this kind can be obtained, for example, by making a regular selection from all the image dots, e.g. by using only a single image dot from each block of 8×8 image dots, i.e. storing it in the bit map. The further procedure described hereinafter is then performed on the reduced image dot set. It will be clear that this gives a considerable gain in processing speed.

Step 10 then searches for clusters of connected pixels, i.e. image dots which adjoin one another or which are connected through the agency of one or more adjoining image dots. A cluster of this kind is hereinafter referred to as "object". This can be carried out, for example, as an iterative process, each search covering image dots adjoining an image dot in a 3×3 image dot environment. At the same time, hence in the same step, a rectangular frame or "object box" is defined for each object of connected image dots to enclose the object. The sides of this frame are parallel to the horizontal and vertical direction (the X and Y directions respectively in the document page). The position of each box thus found is stored in a memory file (the object file) in the form of the coordinates of the top left and bottom right corner points. The number of information-bearing image dots situated therein is also stored for each box.

Figure 4:
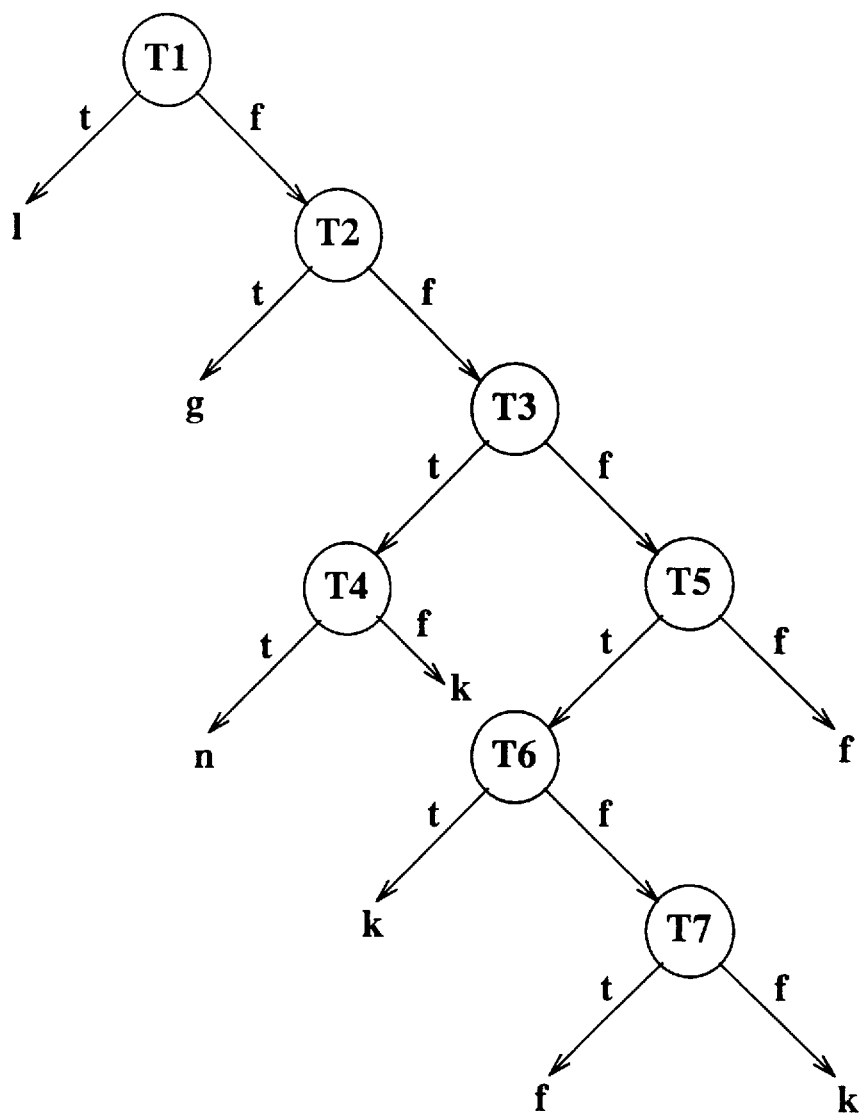
FIG. 4 is a diagram showing the classification procedure for object boxes.

In the next step 12, each box is assigned a label, its dimensions and the number of image dots situated therein determining whether the object in the box relates to a character, photograph, graphics, line or noise. This classification is based on a number of empirical rules which appear to be adequate in practice. All the possibilities are traversed in a graduated test procedure shown in FIG. 4. The consecutive tests are indicated by an encircled T. Two arrows extend from each test, the arrow to the left being applicable if the test gives an affirmative answer and the arrow to the right in the event of a negative answer.

The tests make use of a reference measurement defined as the height of a font (character set) somewhat larger than the font normally used for texts, namely 12 point. If a text with an abnormally large font is analyzed, then the reference measurement must be adjusted, but in practice the same font size is used for a considerable amount of printed matter so that the reference measurement selected is, in most cases, adequate.

Test T1 checks whether the ratio of the longest and shortest side of the object box under examination is large and also whether the shortest side is smaller than half the reference measurement. If so, the object box is given the label "line" (l). Test T2 determines the degree of coverage of the object box, i.e. the number of information-bearing image dots divided by the total number of image dots in the object box. If this is very low, the object box is classified as "graphics" (g). Object boxes clearly larger than the reference measurement and having a relatively low degree of coverage are also classified as "graphics".

In test T3 the remaining object boxes are divided into small object boxes (half as large as the reference measurement) and large object boxes. In test T4 the small object boxes are divided into "noise" (n) (if they are very small) and "character" (k). The large object boxes of test T3 are checked for their measurements in test T5. Very large object boxes (more than three times as large as the reference measurement) are assigned the label "photograph" (f). In test T6 the remaining large object boxes which are smaller than the reference measurement in one direction and somewhat larger in the other direction are provided with the label "character" (k). These are presumably two characters stuck together. The last remaining object boxes are divided in test T7 into (small) photographs (f) if their degree of coverage is very high, and (large) characters (k).

Some corrections are performed on the classification results in the following steps 14, 16 and 18. (FIG. 3) Step 14: A character object whose box overlaps a box of a photoobject is reclassified as a photoobject. This prevents texts in a photograph from undergoing a different image processing operation from the photoobjects. Step 16: When a document page contains one or more bar codes, it is possible, during the classification, that some of the lines are classified as line objects but that the others are classified as character objects. If, in a set of a minimum number of consecutive objects, positioned horizontally or vertically, of the character type, on the one hand, and of the line type, on the other hand, at least a predetermined number of line objects occurs, then a reclassification of objects takes place such that each object in this set is classified as a line object.

Step 18: Very small object boxes which, however, are just too large to be eliminated as noise in test T4, are divided up into small objects with significant information (such as dots and diaereses, etc., above letters and dots as part of a punctuation mark) and small objects without meaning, such as noise dots. The test criterion here is whether a character box is found within a predetermined small distance from such a small object. If so, this small object and the character box thus found are combined to form a new character box.

Step 20 then checks whether the image information originates from a skew original. This term is used to indicate that the document page to which the image data relate is rotated through a certain angle. This angle is termed the skew angle. An accurate method of determining the skew angle based on the recognition of the left-hand margin of the text on the document page will be explained hereinafter with reference to FIG. 6. In the event of a skew angle, the next step 22 reorients the set of object boxes. Reorientation of the boxes is effected by rotating about a fixed point the top left corner point of each object box through an angle which is the opposite of the skew angle. The other corner points of such an object box undergo identical displacement so that the orientation of an object box does not change during this translation.

Step 22 completes the phase of the method for constructing a set of correctly oriented object boxes with an associated object label from a bit map. The objects classified as character are selected in step 24, step 26 then determining text blocks, lines and words in producing a layout structure of the text part. The selection of just the character boxes means that other object boxes are simply cancelled out in this determination and cannot thus act as a disturbing factor to frustrate the determination of the layout structure.

In step 26 the document page is cut, so that it is divided into rectangles by applying cuts alternately in the X direction or the Y direction. Starting with the smallest rectangle in which all the character objects fall (the page block), each block is split into smaller blocks at places where cuts can be made in the X or Y direction. A cut in the X direction in a block to be cut is placed where a horizontal area occurs with a defined width within which there is no single character object.

Similarly, a cut in the Y direction is made in a block where there is a vertical area of a certain width in which there is no single character object. The cuts in the X and Y directions are performed alternately. Thus a block formed as a result of a horizontal cut is then cut vertically. If no cuts can be made in the X and Y directions in a block, an end block is found. By varying the width that a cut must satisfy an end block of this kind can represent a paragraph, line of text, word or character. It should be noted that when starting to search for possible places for making cuts a search must first be made in a given, e.g. horizontal, direction and then in the vertical direction, even if no cut was possible in the horizontal direction, such as may occur, for example, in the case of text arranged in columns.

Figure 5:
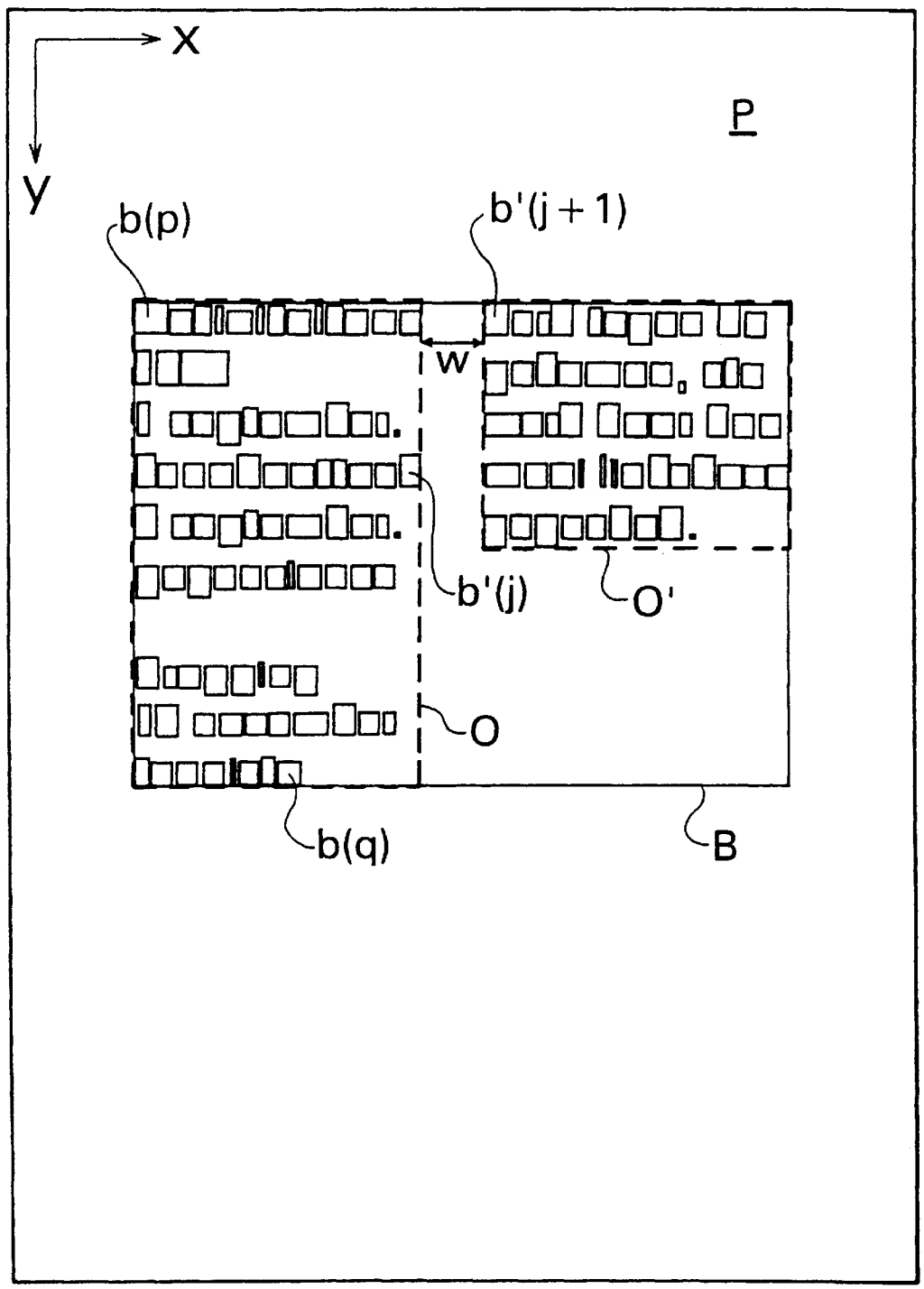
FIG. 5 shows part of a page to be segmented.

Determination of, for example, a vertical cut in a block B will now be explained with reference to FIG. 5. The document page P on which the block B occurs is formed by character object boxes b(i), with i running from 0 (the top left corner) up to and including n (the bottom right-hand corner of the page). The coordinates of the top left and bottom right corners of each box are stored in an object file in the memory. The block B is formed by the object boxes b(j), with j running from p to q and p and q both being situated between 0 and n. The object boxes of the block B are first sorted by ascending X-coordinate from their top left corner and for a constant X-coordinate by ascending Y-coordinate from their top left corner. Standard algorithms are available for this.

The resulting series in which the object boxes are further indicated by b'(i), thus starts with the box situated furthest to the left and, if different boxes have exactly the same X-coordinate, the topmost of those boxes. For each following object box from the series, the smallest enveloping rectangle 0 of the series is then determined, i.e. the rectangle with sides parallel to the x and y axis which just contains all the object boxes of the series, and then the horizontal distance w of the left-hand side of said object box and the enveloping rectangle associated with the previous object box is also calculated.

If the distance w is not greater than a predetermined critical value W, the enveloping rectangle O is extended so that it also contains the new object box, whereupon the following object box is considered. If the distance w, on the other hand, is larger than the critical value W, then the enveloping rectangle associated with the previous object box, O, is closed and a new enveloping rectangle O' is formed around the new object box. This is shown in FIG. 5, where b' (j) is the last object box of enveloping rectangle O and object box b' (j+1) is a horizontal distance w, larger than W, away from the enveloping rectangle O.

The closed enveloping rectangle O is then handled as a subblock of block B. In this way the block B is divided into one or more adjoining subblocks. As a result of the described prior sorting the processing sequence of the object boxes is optimal so that the division into subblocks takes place very rapidly.

After division of block B into subblocks by means of vertical cuts, each subblock is in turn divided into smaller blocks by means of horizontal cuts. This proceeds in a similar manner to that described for vertical cuts, as follows.

The procedure for the horizontal cutting of the subblock O from the above described division operation again starts with sorting the object boxes of the subblock, now by ascending Y-coordinate of their top left corner, and, for constant Y-coordinate, by ascending X-coordinate of their top left corner. The resulting series of object boxes thus starts with the top box, and if different boxes have exactly the same Y-coordinate, the furthest left of those boxes. The smallest enveloping rectangle of the series is then determined for each following object box of the series, and the vertical distance h between the bottom of that object box and the enveloping rectangle associated with the previous object is also calculated. If the distance h is not larger than a predetermined critical value H, the enveloping rectangle is extended to include the new object box as well, whereupon the following object box is considered.

If, on the other hand, the distance h is larger than the critical value H, the enveloping rectangle associated with the previous object box is closed and a new enveloping rectangle is formed around the new object box. The closed enveloping rectangle is then handled as a subblock of subblock O.

The choice of the critical values W and H governs the result of the cuts and should be adapted to the level of the cut and to the size of the object boxes. For example, when a document page is divided into text columns, the value of W can be selected as being three times the average width of the object boxes, and for division of a line of text into words one and a half times the average distance between the boxes in the line (this can be calculated per line during the procedure). These values are determined by experiment.

The cuts in the X and Y directions also govern the corner points of the layout structure of a document page, such as paragraphs, text columns, lines, etc. The resulting layout structure can then be represented hierarchically in accordance with a tree structure.

Figure 6:
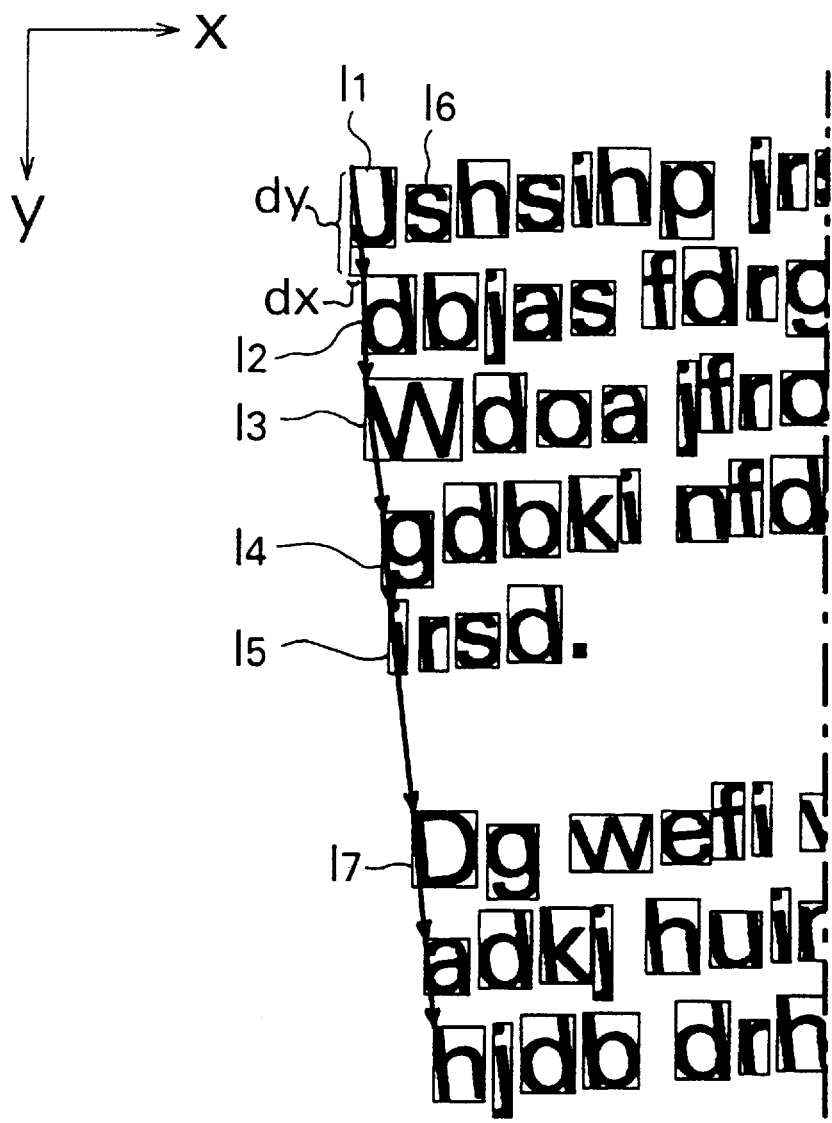
FIG. 6 shows part of a skew text.

The method of determining whether the image data originates from a skew document and, if so, the magnitude of the skew angle, will now be discussed in detail with reference to FIG. 6. This method is used in step 20 in FIG. 3. The method determines the position of the left-hand margin and in so doing uses the object boxes of the "character" type in the object box file. This file contains all the object boxes with the coordinates of their top left and bottom right corner. Where the following description refers to a box, it denotes a character object box. The method takes place in three phases:

searching for the box situated furthest left in each line, selecting from this set those boxes which really belong to the margin, and calculating the skew angle from the direction of the margin.

Once the skew angle has been determined, the object box file can be transformed so that the data therein relate to an aligned document.

The first phase of the method starts with sorting the boxes by ascending X-coordinate and, for a constant X-coordinate, by ascending Y-coordinate, of their top left corner. This is shown in FIG. 6, where part of a skew text is shown rotated in the anti-clockwise direction. Each character is provided with a box and a number of boxes are numbered 11 to 17, in the sequence in which they are sorted. The boxes are then read out and included in the same sequence in a list provided they have no overlap with a box already included in the list previously or with the white space between that box and the box thereabove. This is effected by comparing the segment on the Y-axis occupied by the new box with the segments on the Y-axis which are always limited by the Y-coordinate of the bottom right-hand corner of a given box already included, and that of the bottom right-hand corner of the already included box situated directly thereabove. Since the second and following characters of a line always overlap the first character, even in the event of a skew position, and can thus be eliminated, on completion the list will only contain the first box of each line. The first elements of the list are now thus formed by the boxes 11, 12, 13, 14, 15, 17, etc., in FIG. 6, since box 16 overlaps box 11 and is thus not included in the list.

The boxes in the list are then resorted, now by ascending value of the Y-coordinate of their top left-hand corner. They are then read out from the list one by one and the direction vector from their top left corner to the top left corner of the next box from the list is calculated from the differences dx, dy of their X and Y coordinates. This is shown in FIG. 6, where the arrows always represent the direction vectors. This direction vector is now compared with that of the preceding box, and if its direction does not deviate therefrom by more than a value V, there is a chance that a margin has been found. There can incidentally be more than one margin on a page, e.g. in the case of an indented paragraph. Starting from a predetermined maximum permissible deviation in the X-direction between two characters situated at corresponding positions in two consecutive text lines, the value V is recalculated for each box as a function of the difference in Y-coordinate between the two boxes between which the direction vector is calculated.

The idea underlying this is as follows. Even when a text is completely aligned, there may be small differences in X-position between two characters situated one under the other. These differences are increased by a skew position. This is the result of differences in form. The maximum deviation is made the same for all lines, e.g. 3 image dots. On the basis of a line spacing, for example, of 35 image dots the maximum deviation is then 4.9 for two consecutive lines, but only 1.6 over three lines. The value of V will thus be smaller in proportion as the two boxes between which the direction vector is calculated are farther away from one another in the Y-direction.

After the analysis of the boxes in the list, a search is then made for the longest row of boxes whose direction vectors are equal within the tolerance V and this is then considered as (part of) the margin. From the two end points of the row a search is then made for other boxes situated outside the row and also situated on the margin. This would apply, for example, if there is an indented paragraph in the middle of a page. There are then two page parts, above and below the indented paragraph, situated on the same margin. The direction vector is first determined from the bottommost box of the row to the box beneath it and a check is made whether it is equal, within the tolerance V, to that applicable to the margin boxes. If that is not so (and it will certainly be so for the first box examined), then the box beneath it is tested, and so on, till a box is found whose direction vector does come within the tolerance V. This box is again situated on the margin and is therefore included in the row of margin boxes. Similarly, a search is made in the other direction from the row of margin boxes for other margin boxes.

When all the margin boxes have been found, a straight line is drawn through their top left corners (e.g. by way of the smallest square method) and the skew is calculated from the direction of the straight line. In practice, it is possible with this method to determine a skew accurately to approximately 0.2.

The processing of the image data in memory 208 (FIG. 2), in connection with the layout analysis, will now be discussed with reference to FIG. 7, which shows the control panel 105. After the digital image information of a document (page) has been stored in the internal memory 208 of the apparatus, it is automatically segmented by segmentation module 209. The resulting layout structure is also stored in memory 210. This structure contains the locations of all the character object boxes, and of all the higher elements formed by the text object boxes, such as blocks, lines and words, in addition to the locations and type of all the other object boxes.

An image of the document, on which the object boxes are also drawn, is then shown, reduced if required, on the display of the display unit 102. Using the light pen 103, the operator can now indicate elements on the display. He can indicate which element he wishes to select by one of the keys on the control panel 105 (FIG. 7) under the heading SELECTION LEVEL. If the operator presses the WORD key and indicates a (text) object box with the light pen, then memory 210 searches for the element of the "word" type, of which the indicated object box forms part. This element then appears on the display in framed form or otherwise conspicuously. Similarly, the keys BLOCK and LINE refer to elements of the "block" and "line" type respectively while OBJECT and PAGE refer to a single object box and the whole page respectively. Finally, the AREA key can be used to select a rectangular frame whose dimensions follow the movement of the light pen (known as "rubber banding" in personal computer technology).

Once a layout element has been selected, it can be processed by processing module 212, from the series indicated under the heading OPERATION on the right of the control panel.

If SET COLOR is selected, the selected element is printed in a different color. The UP and DOWN keys can be used to make a choice from a number of available colors. Information as to the possible choices then appears on the display. The processing module 212 then places a code in the memory 208 at the image dot data of the selected layout element, to instruct the printing unit 207 to print the relevant part of the image in the required color.

The SET CONTRAST operation can be used to control the reproduction characteristic (gradation) of the print for the selected element, the UP and DOWN keys making the reproduction harder and softer, respectively. This is important, for example, if the original image is not sufficiently contrasted to give a clear image. In that case the processing module 212 selects a different conversion function from grey value image data to binary (white/black) image data for printing purposes during the halftoning operation.

The selected document can be enlarged or reduced with the RESIZE operation (using the UP and DOWN keys), while INVERT is used to print it in negative form and ROTATE is used to rotate it in the image (the angle of rotation can be selected with the UP and DOWN keys).

The CUT & PASTE heading contains keys for carrying out operations at the location of a selected document. In the case of DUPLICATE, a selected element is copied at the place indicated by the light pen. With MOVE a selected element can be moved ("dragged") across the display while a selected element can be removed from the image with REMOVE.

Finally, the heading INCLUDE contains the keys LOAD for loading image data from an external source, and CREATE PAGE for compiling a document page, for which it is possible to use the keys from the CUT & PASTE heading. In the case of this last function, an empty page image is shown on the display next to the page already selected and layout elements from the selected page can be transferred to the empty page in order thus to compile a new image, e.g. a clippings newssheet.

The above described functions are performed by a computer accommodated in the reproduction apparatus. The programming required for the processing of layout elements is quite well known from computer and PC technology and is therefore not explained in detail here.

The invention has been explained with reference to the above description of an embodiment, but it will be clear to the skilled man that other embodiments also come within the scope of the following claims.

We claim:

1. An apparatus for processing an image represented as dot information, comprising:
   image source means for supplying said image in a bit-map domain represented as digital dot information;
   segmentation means, responsive to the image source means, for automatically segmenting the image into a plurality of layout elements by transforming the image from the bit-map domain into a layout-element domain;
   display means, responsive to the segmentation means, for displaying the segmented image to an operator;
   first selection means, responsive to the display means and the segmentation means, for enabling the operator to select at least one layout element by the operator indicating any portion of the layout element to the first selection means via a position indication device;
   second selections means, responsive to the display means, for enabling the operator to select a processing operation; and
   processing means, responsive to the first and second selection means, for processing at least a portion of the image, corresponding to the selected layout element, in the bit-map domain according to the selected processing operation.

2. An apparatus according to claim 1, wherein:
said processing operation comprises changing a grey value scale.

3. An apparatus according to claim 1, wherein:
the processing operation comprises changing the color in the print on an image support.

4. An apparatus according to claim 1, wherein:
said processing operation comprises the introduction of a raster.

5. An apparatus according to claim 1, wherein:
the processing operation comprises changing the orientation.

6. An apparatus according to claim 1, wherein:
the processing operation comprises changing the location.

7. An apparatus according to claim 1, wherein:
the segmentation means searches the digital image dot information for objects formed by clusters of adjoining information-bearing image dots, and performs the automatic segmenting into layout elements on the basis of said objects.

8. An apparatus according to claim 7, wherein:
the segmentation means assigns to each object a frame, hereinafter referred to as an object box, having two horizontal and two vertical sides and, stores the location data of the object box in a memory.

9. An apparatus according to claim 8, wherein:
the segmentation means assigns an object label to an object, said object label being representative of the type of information of said object.

10. Apparatus according to claim 9, wherein the segmentation means only makes use of objects having predetermined object labels in the said segmenting.

11. Apparatus according to claim 10, wherein the said predetermined object labels are those labels which indicate that the object represents a character.

12. Apparatus according to claim 7, wherein prior to the cutting operations the segmentation means first determine whether and, if so, to what extent the page image is skew with respect to the vertical and horizontal directions and, if so, align the set of objects by adapting the location data of the objects in accordance with a rotation through the skew angle.

13. An apparatus as in claim 1, further comprising:
printer means, responsive to the processing means, for printing the processed image.

14. An apparatus as in claim 1 wherein:
the dot information in said image corresponds to a plurality of types of layout elements;
the segmentation means automatically categorizes each layout element by the type to which the layout element corresponds;
the apparatus further including:
   supplemental selection means, responsive to the first selection means, for enabling an operator to select at least one type of layout element;
wherein the processing means processes all layout elements of the type selected by the operator.

15. An apparatus as in claim 1, further comprising:
proxy means, responsive to the first and second selection means, for providing, separately from the image, digital dot information representing the at least one selected element.

16. An apparatus as in claim 15, wherein said processing means includes:
creating means for creating a receiving image; and transfer means for providing a selected layout element to the creating means.

17. An apparatus as in claim 16, wherein said processing operation includes:

a copying & pasting function such that the operator can copy a selected layout element and paste it into said receiving image.

18. An apparatus as in claim 16, wherein:

said means for displaying said image displays the same together with said receiving image.

19. An apparatus as in claim 18, wherein:

the transfer means provides a selected layout element by copying the selected layout element to said creating means.

20. An apparatus as in claim 16, wherein:

the processing means also compiles a receiving image from layout elements provided thereto.

21. An apparatus as in claim 1, wherein the processing operation includes:

changing the size of the at least one selected layout element.

22. A method for processing an image represented as dot information, comprising:

a) supplying said image in a bit-map domain represented as digital dot information;

b) automatically segmenting the supplied image into a plurality of layout elements by transforming the image from the bit-map domain into a layout-element domain;

c) displaying the segmented image to an operator;

d) enabling the operator to select at least one layout element by the operator indicating any portion of the layout element via a position indication device;

e) enabling the operator to select a processing operation; and f) processing at least a portion of the image, corresponding to the selected layout element, in the bit-map domain according to the selected processing operation.

23. A method as in claim 22, wherein the processing operation includes:

changing a grey value scale.

24. A method as in claim 22, wherein the processing operation includes:

changing the color.

25. A method as in claim 22, wherein the processing operation includes:

introducing a raster.

26. A method as in claim 22, wherein the processing operation includes:

changing the orientation.

27. A method as in claim 22, wherein the processing operation includes:

changing the location.

28. A method as in claim 22, wherein the processing operation includes:

changing the size of the at least one selected layout element.

29. A method as in claim 22, wherein the step b) includes:

b1) searching the image for objects formed by clusters of adjoining information-bearing dots; and b2) segmenting the image according as a function of the objects found.

30. A method as in claim 29, wherein the step b) includes:

b3) assigning an object box to each object, an object box having two horizontal and two vertical sides.

31. A method as in claim 30, wherein the step b) includes:

b4) assigning an object label to an object, the object label representing the type of information of said object.

32. A method as in claim 22, further comprising:

g) printing the processed image.

33. A method as in claim 22, wherein:

the dot information in an image corresponds to a plurality of types of layout elements;

the step b) includes:

b1) automatically categorizing each layout element by the type to which the layout element corresponds;

wherein the step d) includes:

d1) enabling the operator to select at least one type of layout element;

d2) selecting all layout elements of the type selected by the operator;

wherein the step f) processes all layout elements of the type selected by the operator.

34. A method as in claim 22, further comprising:

g) providing, separately from the image, digital dot information representing the at least one element selected by the operator.

35. A method as in claim 22, further comprising:

g) creating a receiving image; and h) providing a selected layout element for said creating step g).

36. A method as in claim 35, further comprising:

i) displaying said image for which the layout elements have been segmented together with said receiving image.

37. A method as in claim 35, wherein:

i) compiling said receiving image from layout elements provided thereto.

38. A method as in claim 35, wherein the step h) includes:

h1) copying a selected layout element to said receiving image.

39. A method as in claim 35, wherein the step h) includes:

h1) transferring a selected layout element for said creating step g).

40. A method as in claim 35, wherein said processing operation includes:

a copying & pasting function such that the operator can copy a selected layout element and paste it into said receiving image.

* * * * *